April 13, 1937. C. A. ROGGE 2,076,745
TRANSMISSION LINE SUPPORT
Filed April 29, 1936
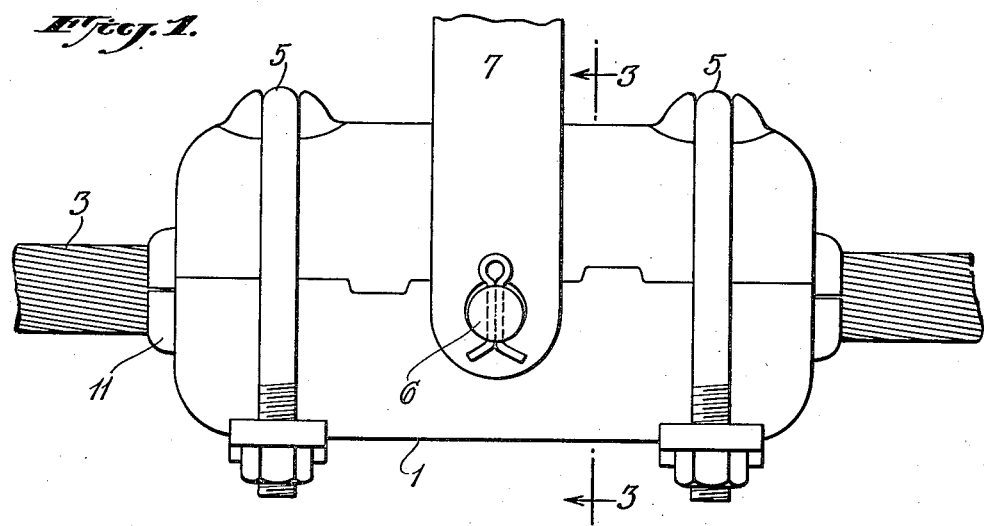
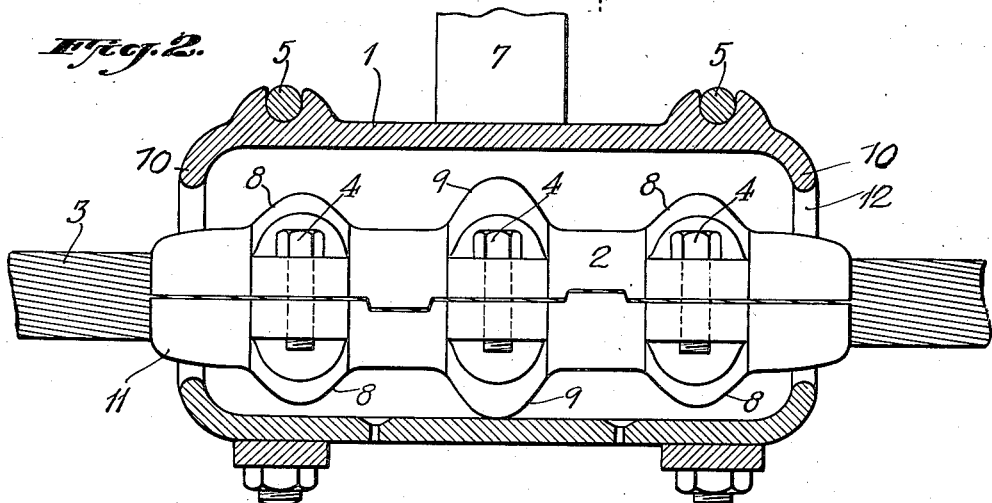
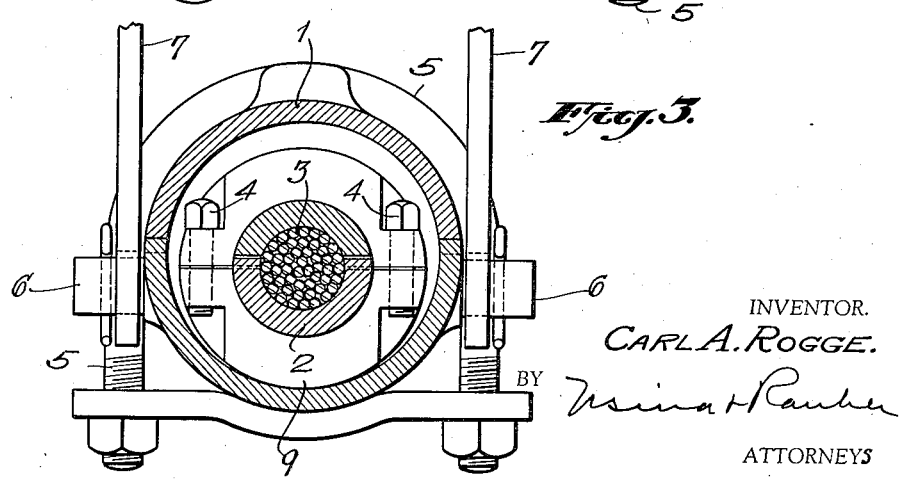
INVENTOR.
CARL A. ROGGE.
BY
ATTORNEYS Patented Apr. 13, 1937

2,076,745

UNITED STATES PATENT OFFICE 2,076,745

TRANSMISSION LINE SUPPORT

Carl A. Rogge, Hastings on Hudson, N. Y., assignor to Anaconda Wire & Cable Company, New York, N. Y., a corporation of Delaware Application April 29, 1936, Serial No. 76,916

7 Claims. (Cl. 248—63)

This invention relates to an improved device for the support of overhead transmission line designed to operate at high voltages. The usual form of such conductors tends to place a maximum quantity of conducting metal at the periphery of the cross-section of the cable with a minimum quantity at the core. This design is favored since it reduces the losses due to so-called skin effect and also minimizes corona discharges. Cables made in this manner are frequently composed of a multiplicity of self-sustaining interlocking strands or else comprise layers of conducting strands arranged over a relatively light core.

Conductors of this type are, necessarily, somewhat more prone to failure due to vibration or to excessive stresses at the points of support and, for a maximum period of service, must be carried by supports which are designed especially for such service.

The chief object of this invention is to provide a support which will relieve the cable of stress at the point of support, decrease failures due to vibration of the conductor, and prevent the cable, in the event of breakage, from running through the supports and bringing down adjacent spans.

These and further objects of the invention will be apparent from the following detailed description when read in conjunction with the accompanying drawing, in which—

Fig. 1 is an elevation of a cable and its support; Fig. 2 is a view partly in elevation and partly in cross-section of the cable and support shown in Fig. 1; Fig. 3 is a cross-section on line 3—3 of Fig. 1.

Referring to the drawing, the embodiment of the invention illustrated comprises a hollow supporting shell 1 of substantially cylindrical form and an enclosed clamping means 2 adapted to be secured to the cable 3, by bolts 4 which, when tightened, firmly grip the cable 3 between the two complementary members of the clamp 2. The supporting shell is preferably made up of two members secured together with U bolts 5, and provided with lugs 6 of suitable form for engagement with eyes in a hanger which is adapted to be attached to an insulator string, not shown.

The clamp 2 is provided at its ends with raised annular bosses 8, which support the clamp within the outer shell 1. Preferably, I also provide the center boss 9 with a greater external radius so that in the main the cable will be supported at that point.

A support of this type is well adapted to absorb or relieve the various tensile, vibratory or radial stresses which may occur in operation. It is apparent that no restraint is imposed on the cable to prevent rotation within the supporting structure and that the cable can, therefore, equalize such stresses between the several spans.

It is well known that vibration is a frequent cause of failures in conductors of this type, rupture usually occurring in the locality of the supports. This invention provides a clamp in which vibratory waves may be transferred through the support without restraint and consequent distortion of the strands. Inasmuch as the cable is free to pivot about the supporting boss 9, the tendency to bend the strands is almost entirely eliminated.

The extremities 10 of the wall of the supporting shell 1 converge inwardly so that the internal diameter of the end openings 12 is less than the external diameter of the bosses 8. Thus, the converging ends form abutments which coact with the bosses 8 to prevent an unbroken span from falling when an adjacent span fails. Preferably, the ends of the clamp 11 are tapered to avoid an abrupt change in diameter from the cable to the boss. This construction is of importance since, in the event of failure of the conductor in a span adjacent the support, the clamp will lock itself firmly in the end of shell and prevent the unbroken spans of the cable from falling.

While I have described quite specifically details of the embodiment of the invention herein illustrated various modifications may be made by those skilled in the art without departure from the invention as defined in the appended claims.

What I claim is:

1. A support for transmission lines comprising a hollow supporting shell having internal abutments and a clamp adapted to be rigidly attached to a cable and freely movable within said supporting shell and having bosses for coaction with said abutments.

2. In combination, a cable having a clamp secured thereto provided with an intermediate enlargement, and an enclosing casing in which the clamp is slidable longitudinally and on whose inner surface said enlargement is adapted to freely fulcrum said clamp including means to prevent its being pulled endwise out of the casing.

3. In combination, a cable having a clamp secured thereto which is provided with enlarged annular bosses, an enclosing supporting structure surrounding the clamp and having inwardly converging ends defining annular abutments for coaction with said bosses.

4. A cable support comprising a clamp secured to a cable and an enclosing member adapted to permit limited movement of said clamp relatively thereto, said enclosing member having end openings through which the cable extends, which are a size to provide ample clearance for the cable, but smaller than the greatest diameter of the clamp.

5. In combination, a cable having a clamp secured thereto, a pair of annular bosses adjacent the ends of the clamp, an intermediate annular boss of larger diameter than the end bosses, a support comprising a shell-like casing surrounding the clamp and having a wall on which said intermediate boss is adapted to rest, said casing having end openings of smaller diameter than said end bosses.

6. In combination, a cable having a clamp secured thereto, which is provided with a plurality of longitudinally spaced annular enlargements, a casing comprising a pair of complementary shell-like members encircling the clamp and having end openings of smaller diameter than said enlargements, means securing said members to one another, and a hanger having a pivotal connection with one of said shell-like members.

7. In combination, a cable having a clamp secured thereto provided with end annular enlargements and an intermediate enlargement of greater diameter than said end enlargements, a two part casing comprising shell-like members on one of which said intermediate enlargement is adapted to fulcrum, means detachably securing said shell-like members in assembled relationship, the ends of said shell-like members being converged inwardly to define abutments for limiting the endwise movement of said enlargements.

CARL A. ROGGE.